(12) United States Patent
Bergmann

(10) Patent No.: US 9,593,802 B2
(45) Date of Patent: Mar. 14, 2017

(54) ARTICLE OF MANUFACTURE FOR HANGING AN OBJECT

(71) Applicant: Coral Bergmann, Carlsbad, CA (US)

(72) Inventor: Coral Bergmann, Carlsbad, CA (US)

( * ) Notice: Subject to any disclaimer, the term of this patent is extended or adjusted under 35 U.S.C. 154(b) by 40 days.

(21) Appl. No.: 13/844,276

(22) Filed: Mar. 15, 2013

(65) Prior Publication Data

US 2013/0240703 A1    Sep. 19, 2013

Related U.S. Application Data

(60) Provisional application No. 61/611,986, filed on Mar. 16, 2012.

(51) Int. Cl.
*A47F 5/08* (2006.01)
*F16M 13/02* (2006.01)
*G09F 7/18* (2006.01)

(52) U.S. Cl.
CPC ........... *F16M 13/02* (2013.01); *G09F 7/18* (2013.01); *A47F 5/0807* (2013.01); *A47F 5/0892* (2013.01); *G09F 2007/1804* (2013.01)

(58) Field of Classification Search
USPC ............. 248/302, 685, 686; 224/172, 651; 40/606.11, 607.12, 617, 607.14
See application file for complete search history.

(56) References Cited

U.S. PATENT DOCUMENTS

| | | | | |
|---|---|---|---|---|
| 1,674,565 A * | 6/1928 | Peterson | | 40/613 |
| 2,911,746 A * | 11/1959 | Edward Frey | | 40/604 |
| 2,960,785 A * | 11/1960 | Kies | | 40/604 |
| 3,609,894 A * | 10/1971 | Miller, III | | G09F 17/00 40/604 |
| 3,823,587 A * | 7/1974 | Tcherdakoff | | 70/456 R |
| 5,151,778 A * | 9/1992 | Conley | | A45C 11/04 2/452 |
| 5,651,468 A * | 7/1997 | Irizarry | | 211/120 |
| 6,866,940 B1 * | 3/2005 | Laughlin | | 428/542.2 |
| 8,025,146 B2 * | 9/2011 | Willis et al. | | 206/217 |
| 2004/0144006 A1 * | 7/2004 | Chu | | 40/453 |
| 2007/0255395 A1 * | 11/2007 | Pollock et al. | | 623/1.36 |
| 2013/0042724 A1 * | 2/2013 | Hulings | | B25B 13/52 81/64 |

* cited by examiner

*Primary Examiner* — Alfred J Wujciak
(74) *Attorney, Agent, or Firm* — Coastal Patent Law Group, P.C.

(57) ABSTRACT

An article of manufacture is configured for hanging signs and other objects to poles, fences, trees and other structures. The article generally includes a gripping base and a pair of elongated coiled filaments each extending from opposing sides of the base, the filaments each comprising a coiled length and a straightened tip disposed at a terminal end of the respective tip. The article is wrapped around a support structure and each of the tips is inserted through a respective aperture of a sign to be hanged and pulled through the aperture to secure the sign to the structure.

12 Claims, 6 Drawing Sheets

# ARTICLE OF MANUFACTURE FOR HANGING AN OBJECT

CROSS-REFERENCE TO RELATED APPLICATIONS

This application claims benefit of priority with U.S. Provisional Ser. No. 61/611,986, filed Mar. 16, 2012, and titled "ARTICLE OF MANUFACTURE FOR HANGING AN OBJECT"; the contents of which are hereby incorporated by reference.

BACKGROUND OF THE INVENTION

Field of the Invention

This invention relates to an article of manufacture for hanging signs and similar objects; and more particularly, to such an article adapted for improved hanging and removal of various signs and other objects against various structures such as poles, fences, trees and the like.

Description of the Related Art

Small cardboard, paper and plastic signs are commonly used to indicate real property for sale, garage sales, birthday parties, and other events or offerings for public notice. These signs are generally stapled, tacked, nailed, zip-tied, or glued to various surfaces or structures for hanging and display thereof. Moreover, certain signs are adapted for attachment with a wood or metal stakes, frames, scaffolds, or other sign holders.

However it remains a longstanding need in the art for a sign hanger adapted with a low form-factor for improved storing and transporting a large volume of signs and hangers. It further remains a need in the art for a lightweight sign hanger adapted for improved ergonomic and simplified hanging and removal of such signs.

SUMMARY OF THE INVENTION

A lightweight and small-form article of manufacture is provided for hanging signs and other objects. The article comprises a planar gripping base having up to several gripping members disposed thereon, a first coiled filament attached to the base at a first side thereof, and a second coiled filament attached to the base at a second side opposite of the first side. Each of the coiled filaments further extends outwardly from the base toward a distal end and comprises a linear tip extending outwardly at the distal end.

The article is adapted for ergonomic attachment and removal with one or more signs, low cost production, environmental considerations including reuse, and durable and reliable sign hanging among other features.

DETAILED DESCRIPTION OF THE PREFERRED EMBODIMENTS

Figure 1:
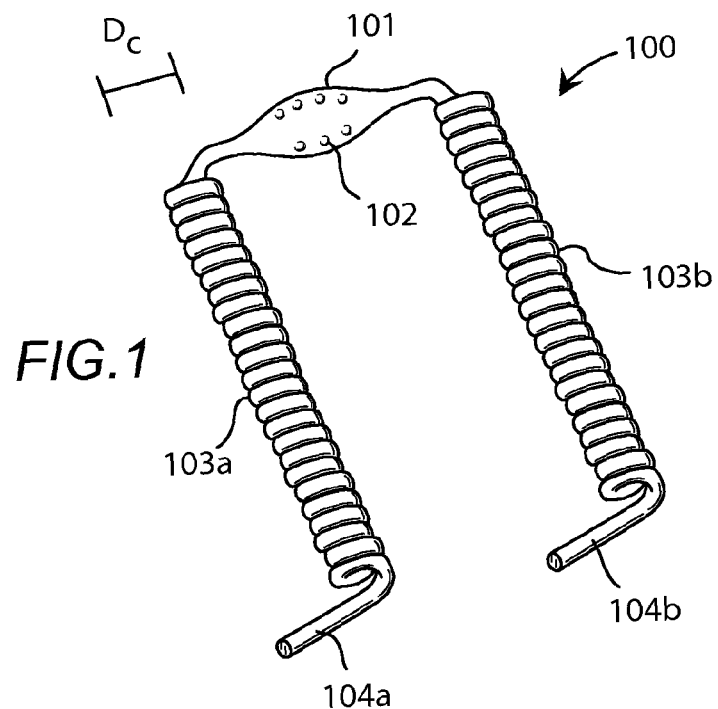
FIG. 1 illustrates the article of manufacture according to various embodiments of the invention.

Now turning to FIG. 1, an article of manufacture 100 for hanging signs and other objects comprises a base 101 having up to several gripping members 102 disposed thereon. The gripping members may comprise a logo, one or more embossed or extruded features, an embossed or extruded text, or other traction providing gripping members 102. Generally, the base 101 is planar, however may comprise any shape or style adapted for providing a friction type grip for hanging a sign or similar object. The base further comprises a first coiled filament 103a attached at a first side thereof, and a second coiled filament 103b attached at a second side opposite of the first side. The coiled filaments extend outwardly from the base toward a distal end, wherein each of said coiled filaments further comprises a straight tip 104a, 104b, respectively, disposed at the distal end thereof.

Figure 2:
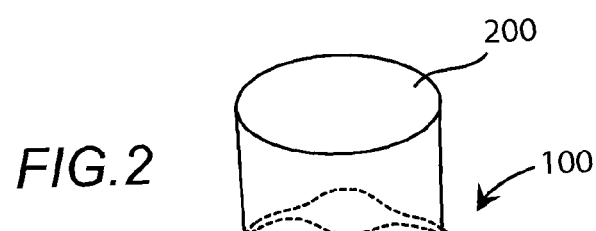
FIG. 2 illustrates the article of FIG. 1 wrapped about a post and adapted to hang a sign thereon.

As illustrated in FIG. 2, the article of manufacture 100 is adapted to attach to a sign 300 having a first aperture 310a and a second aperture 310b disposed thereon. In this regard, the first coiled filament 103a of the article 100 is adapted for insertion through the first aperture 310a of the sign, and the second coiled filament 103b of the article 100 is adapted for insertion through the second aperture 310b of the sign. Thus, a user may secure a sign to a post 200, chain link fence, or other support structure using the article 100 by simply wrapping the coiled filaments around the support structure and inserting the straight tips 104a, 104b, respectively, through the apertures 310a, 310b, respectively, and pulling taught to securely fasten the sign to the support structure, such as a post 200.

The coiled filaments 103a and 103b provide an additional friction about the post 200, or other support structure, the friction force being proportional to the surface area of the coiled filaments placed in contact with the post or other structure. This surface area can be termed a "contact patch", and grip increases in relation to the contact patch size. In addition, the base provides gripping members for added traction and frictional retention of the sign about the post or other affixing location.

It has been discovered by the inventor listed herein that the coiled filaments provide sufficient frictional retention of the sign about the apertures if the apertures of the sign are less than or equal to ninety percent (95%) of the coil-diameter "Dc". In this regard, the coil-diameter should be larger than an outer-diameter of the filament itself.

Thus, in a general embodiment the invention comprises: a base adapted for gripping a post or similar object; a first coiled filament attached to the base at a first end and extending outwardly from the base toward a first distal end; a second coiled filament attached to the base at a second end opposite of the first end and extending outwardly toward a second distal end; a first straight tip attached to said first coiled filament at the first distal end; and a second straight tip attached to said second coiled filament at the second distal end.

Now turning to FIGS. 3-9, all sides of the article are illustrated in turn.

Figure 3:
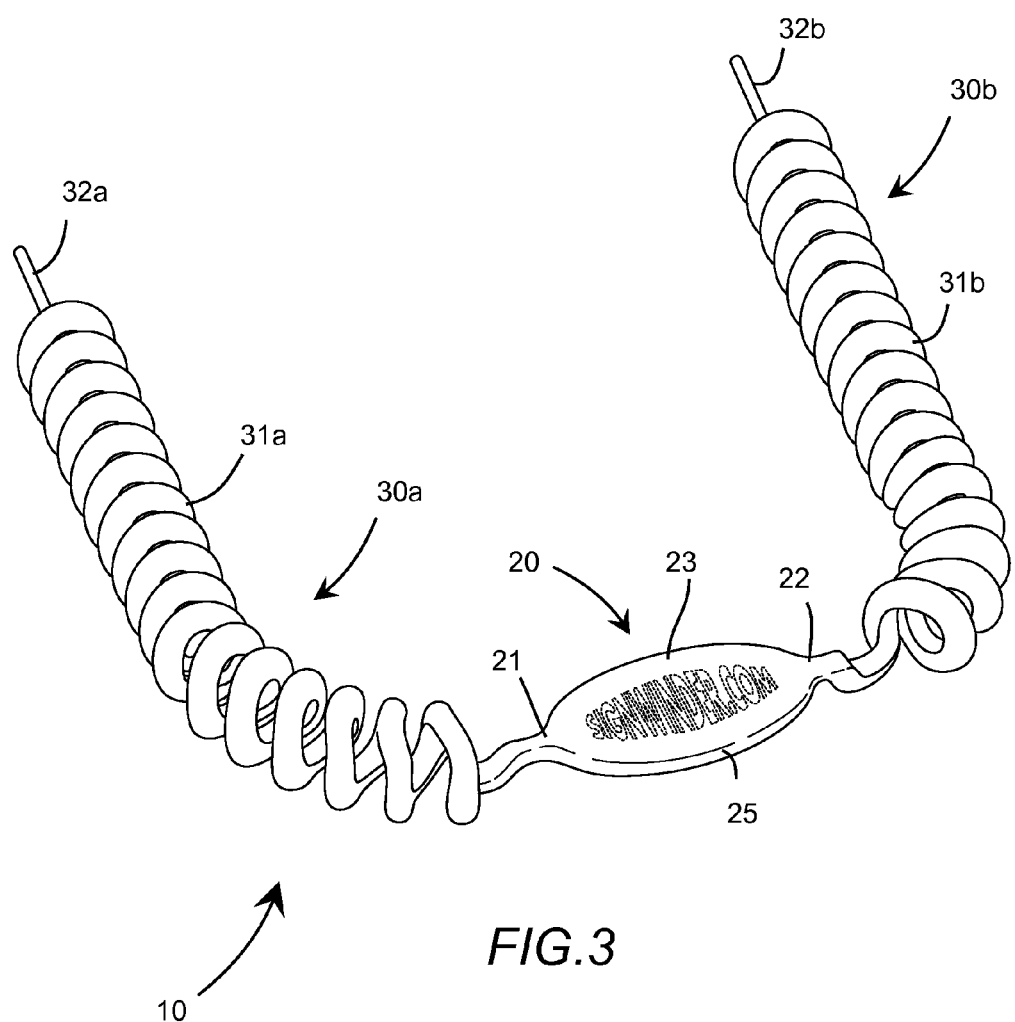
FIG. 3 is a perspective view of the article showing a top, front, and left side thereof.

FIG. 3 is a perspective view of the article 10 showing a top, front, and left side thereof. The article comprises a planar base 20 having a first surface 23 and a second surface opposite of the first surface. The planar base comprises a peripheral edge 25 or "periphery" extending along the sides of the base. A first elongated securing element 30a extends outwardly from the planar base 20 at a first side 21 thereof. The first elongated securing element comprises a filament having a plurality of coils 31a extending along a coil portion toward a distal end. A straight filament tip 32a extends outwardly from the coiled portion 30a at the distal end. A second elongated securing element 30b extends outwardly from the planar base 20 and is attached at a second side 22 of the base. The second elongated securing element 30b is similar to the first elongated securing element 30a, and comprises a filament having a plurality of coils 31b extending along the coil portion toward a distal end, and a straight filament tip 32b extending outwardly from the coil portion at the distal end thereof. As-illustrated in FIG. 3, the planar base (20), first elongated securing element (30a) and second elongated securing element (30b) collectively form a monolithic single-piece article for hanging signs and other objects.

Figure 4:
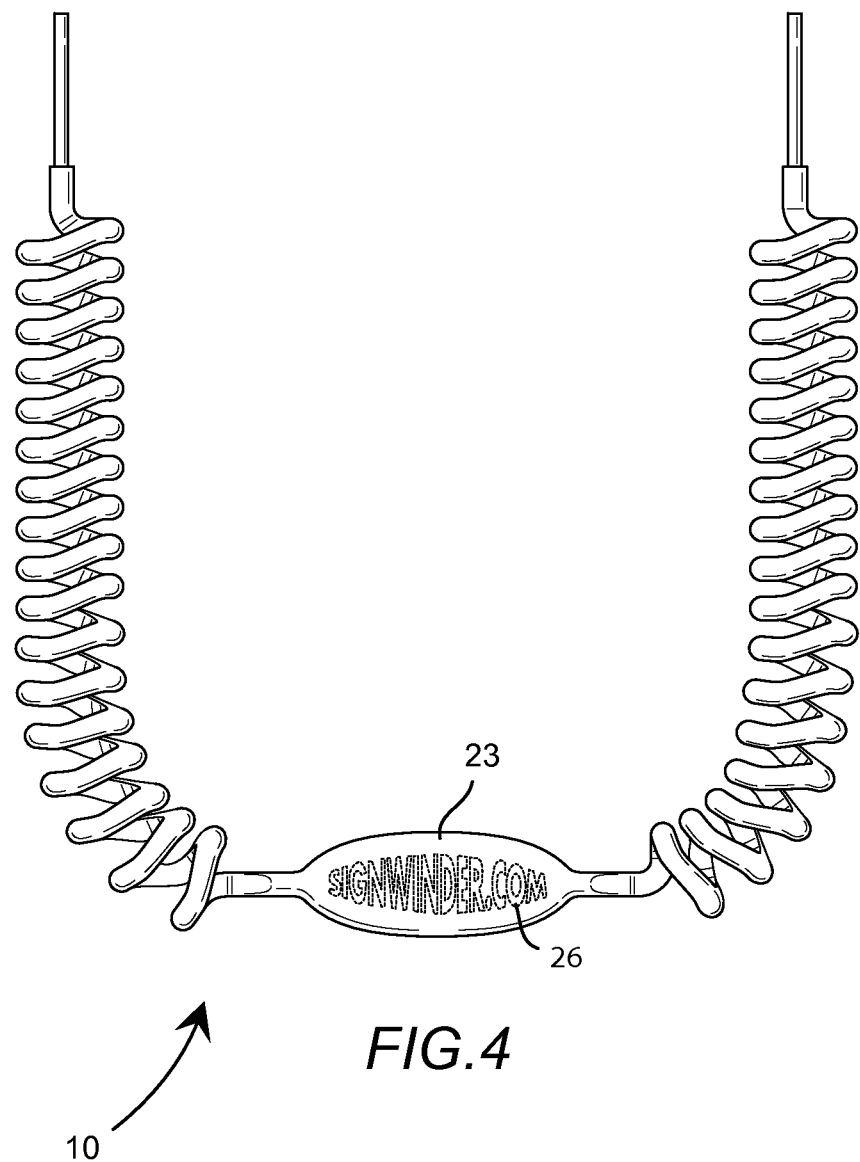
FIG. 4 shows a top view of the article.

FIG. 4 shows a top view of the article 10. The planar base comprises a first surface 23 configured with one or more gripping members disposed thereon to form one or more typographical characters 26.

Figure 5:
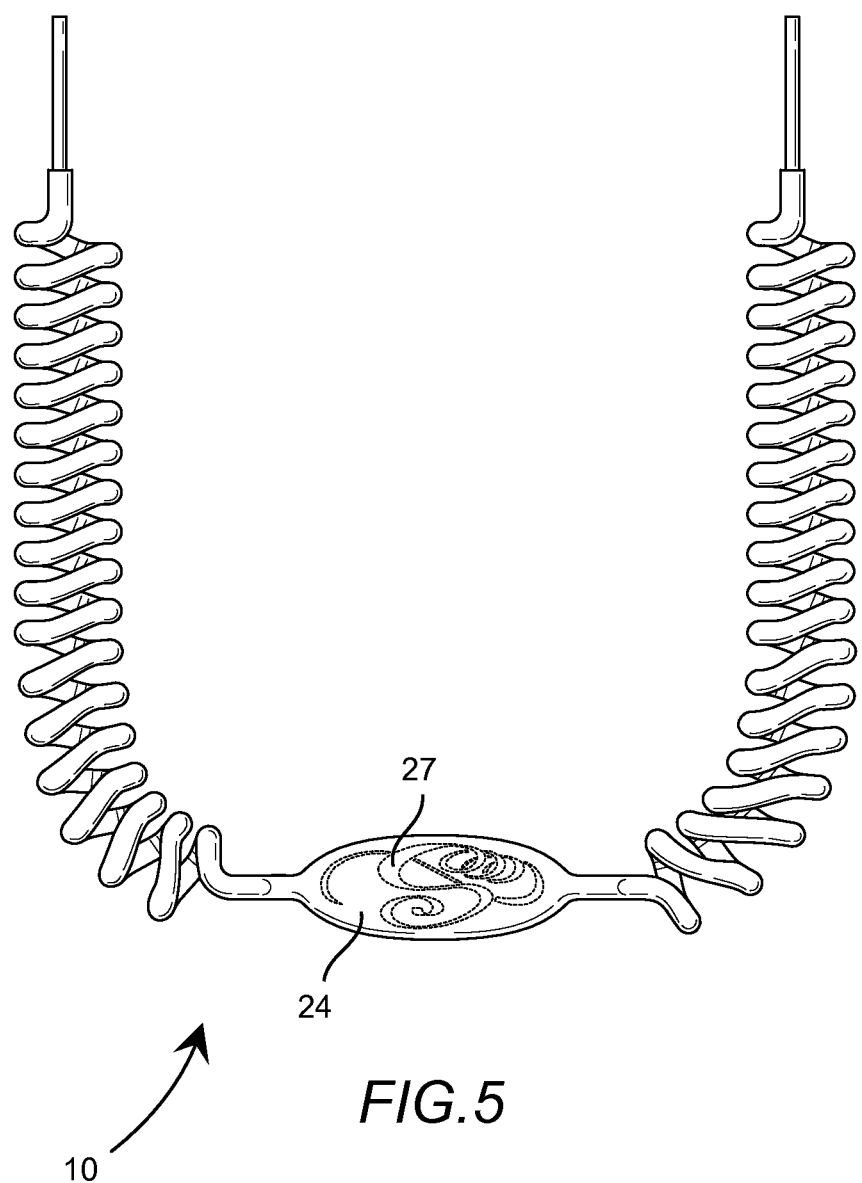
FIG. 5 shows a bottom view of the article.

FIG. 5 shows a bottom view of the article. The planar base comprises a second surface 24 opposite of the first surface. The second surface 24 is configured with one or more gripping members disposed thereon to form a logo 27.

Figure 6:
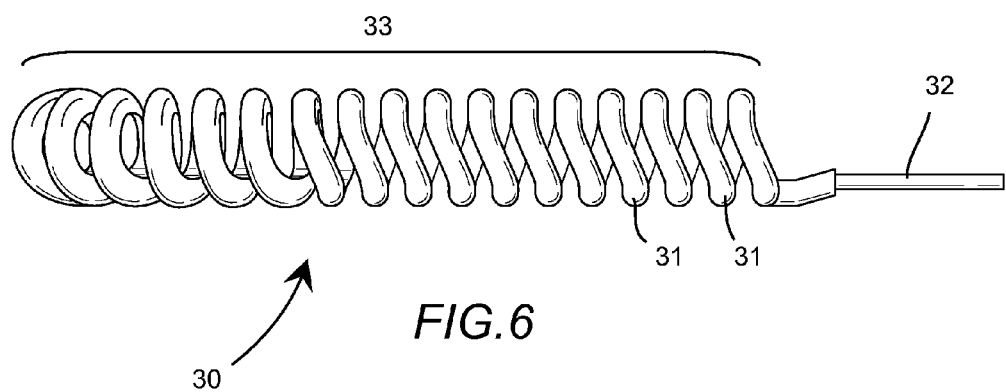
FIG. 6 shows a right side view of the article.

FIG. 6 shows a right side view of the article. The elongated securing element 30 generally comprises a plurality of coils 31 disposed along a coil portion 33 of the filament and a distal filament tip 32 comprising an elongated extruded rod configured to extend straight outwardly from the coil portion.

Figure 7:
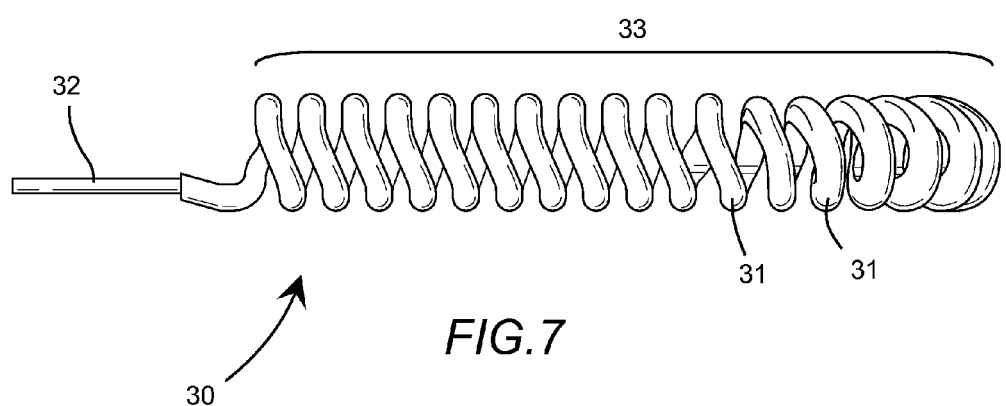
FIG. 7 shows a left side view of the article.

FIG. 7 shows a left side view of the article. The elongated securing element 30 is similar to the opposing view of FIG. 6.

Figure 8:
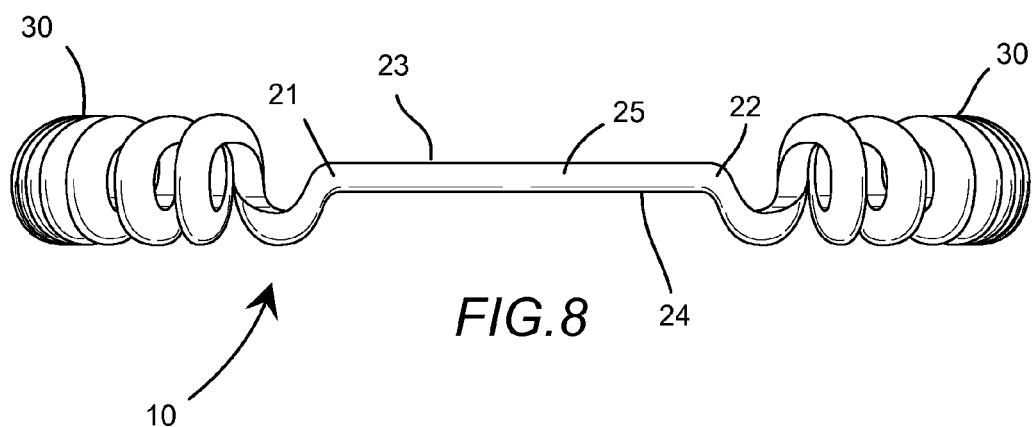
FIG. 8 shows a front view of the article.

FIG. 8 shows a front view of the article. The front view more clearly shows the planar base comprising a first surface 23 and second surface 24 opposite of the first surface. The two elongated securing elements 30 are each attached to the planar base at a first side 21 and second side 22 thereof.

Figure 9:
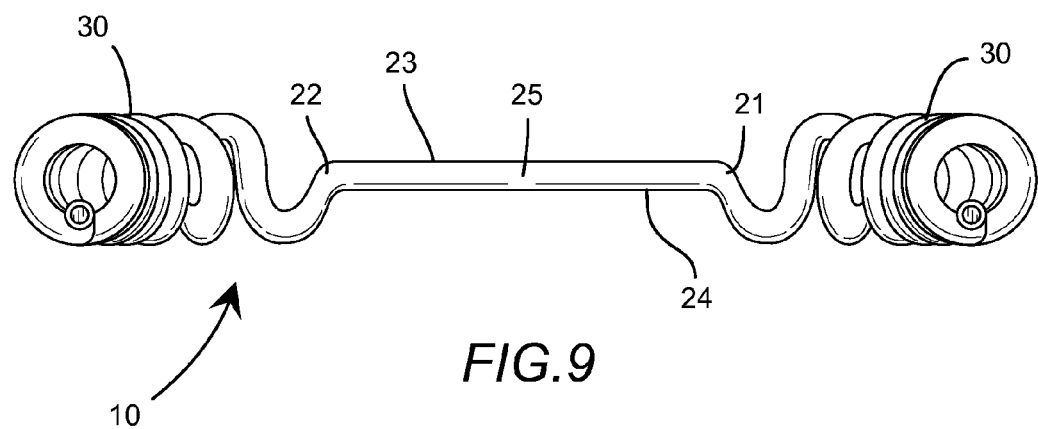
FIG. 9 shows a rear view of the article.

FIG. 9 shows a rear view of the article. The rear view shows the features of FIG. 8 from a rear view perspective.

The article can be manufactured from a stretchable polymer (plastic), such as thermoplastic polyurethane (TPU), or other similar composition. Certain thermoplastics and other polymers capable of shape memory retention may be desired for fabrication of the article. The article can be injection molded. Nickel titanium (Nitinol) or other shape memory metals may also be used to manufacture the article.

Thus, in various embodiments, the article for hanging signs and other objects, comprises:

a planar base having a first surface and a second surface disposed opposite of the first surface, at least one of the first and second surfaces comprising one or more frictional gripping members; the planar base further comprising a peripheral edge having a first side disposed opposite of a second side;

a first elongated securing element comprising:
a length of flexible coiled cord extending from a proximal end toward a distal end; and
a filament tip extending outwardly from the coiled cord at the distal end; and
a second elongated securing element being similar to the first elongates securing element;

wherein the first elongated securing element is attached to the planar base at the first side and the second elongated securing element is attached to the planar base at the second side thereof.

In another embodiment, the frictional gripping members are configured in a pattern representing a logo.

In another embodiment, the frictional gripping members are configured in a pattern representing one or more characters, wherein the characters are selected from: letters, numbers, and symbols.

In another embodiment, each of the elongated securing elements is configured to be expandable from a first length to a second length, wherein the second length is greater than the first length.

In another embodiment, an article for hanging signs and other objects comprises a planar base having a first elongated securing element extending outwardly from a first side thereof and a second elongated securing element extending outwardly from a second side thereof, the first and second sides being disposed opposite of one another about a periphery of the planar base.

In another embodiment, each of the elongated securing elements comprises a length of flexible coiled cord extending from a proximal end toward a distal end; and a filament tip extending outwardly from the coiled cord at the distal end.

In another embodiment, the flexible coiled cord forms an axis extending outwardly from the planar base, and the filament tip is configured to extend outwardly from the coiled cord in a direction parallel with the axis of the coiled cord.

In another embodiment, the article comprises one or more frictional gripping members disposed on the planar base.

In another embodiment, the frictional gripping members are configured in a pattern representing a logo.

In another embodiment, the frictional gripping members are configured in a pattern representing one or more characters, wherein the characters are selected from: letters, numbers, and symbols.

In another embodiment, the article is fabricated from a flexible polymer composition.

In another embodiment, the article is fabricated from a composition that at least partially comprises thermoplastic polyurethane.

In another embodiment, the article is fabricated from a composition at least partially comprising nitinol.

Other design characteristics, such as shape of the base, outer-diameter of the filament, coil-diameter, design of friction members disposed on the base, material for fabrication, length of the coiled filaments, and other variable features can be tailored to accomplish the hanging of any object with only minor experimentation and thus any changes to the illustrated and described embodiment for the same purpose or to accomplish a similar objective is therefore intended to be within the spirit and scope of the invention.

I claim:

1. An article for hanging signs and other objects, comprising:
a planar base having a first surface and a second surface disposed opposite of the first surface, the first surface comprising one or more frictional gripping members, each of the gripping members forming a bump of material raised above the first surface; the planar base further comprising a peripheral edge having a first side disposed opposite of a second side;

a first elongated securing element comprising:
- a length of flexible coiled cord extending from the peripheral edge of the planar base at the first side thereof; and
- a filament tip extending outwardly from the coiled cord; and a second elongated securing element being identical to the first elongated securing element, said second elongated securing element extending from the peripheral edge of the planar base at the second side thereof;

wherein the planar base, first elongated securing element and second elongated securing element of the article form a monolithic piece.

2. The article of claim 1, wherein said frictional gripping members are configured in a pattern representing a logo.

3. The article of claim 1, wherein said frictional gripping members are configured in a pattern representing one or more characters, wherein said characters are selected from: letters, numbers, and symbols.

4. The article of claim 1, wherein each of the elongated securing elements is configured to be expandable from a first length to a second length, wherein said second length is greater than the first length.

5. An article for hanging signs and other objects, comprising: a base having a peripheral edge; a first elongated securing element fixed to the peripheral edge of the base and extending outwardly from a first side thereof; and a second elongated securing element fixed to the peripheral edge of the base and extending outwardly from a second side thereof; the first and second elongated securing elements being fixedly disposed opposite of one another about the peripheral edge of the base; wherein the base and said first and second elongated securing elements form a monolithic piece; and wherein each of said elongated securing elements comprises a length of flexible coiled cord extending from a proximal end toward a distal end; and a filament tip extending outwardly from the coiled cord at the distal end.

6. The article of claim 5, wherein the flexible coiled cord forms an axis extending outwardly from the base, and the filament tip is configured to extend outwardly from the coiled cord in a direction parallel with the axis of the coiled cord.

7. The article of claim 5, comprising one or more frictional gripping members disposed on the base, each of the gripping members forming a bump of material raised above a surface of the base.

8. The article of claim 7, wherein said frictional gripping members are configured in a pattern representing a logo.

9. The article of claim 7, wherein said frictional gripping members are configured in a pattern representing one or more characters, wherein said characters are selected from: letters, numbers, and symbols.

10. The article of claim 5 comprising a flexible polymer composition.

11. The article of claim 10 at least partially comprising thermoplastic polyurethane.

12. The article of claim 5 at least partially comprising a shape-memory alloy.

* * * * *